UNITED STATES PATENT OFFICE.

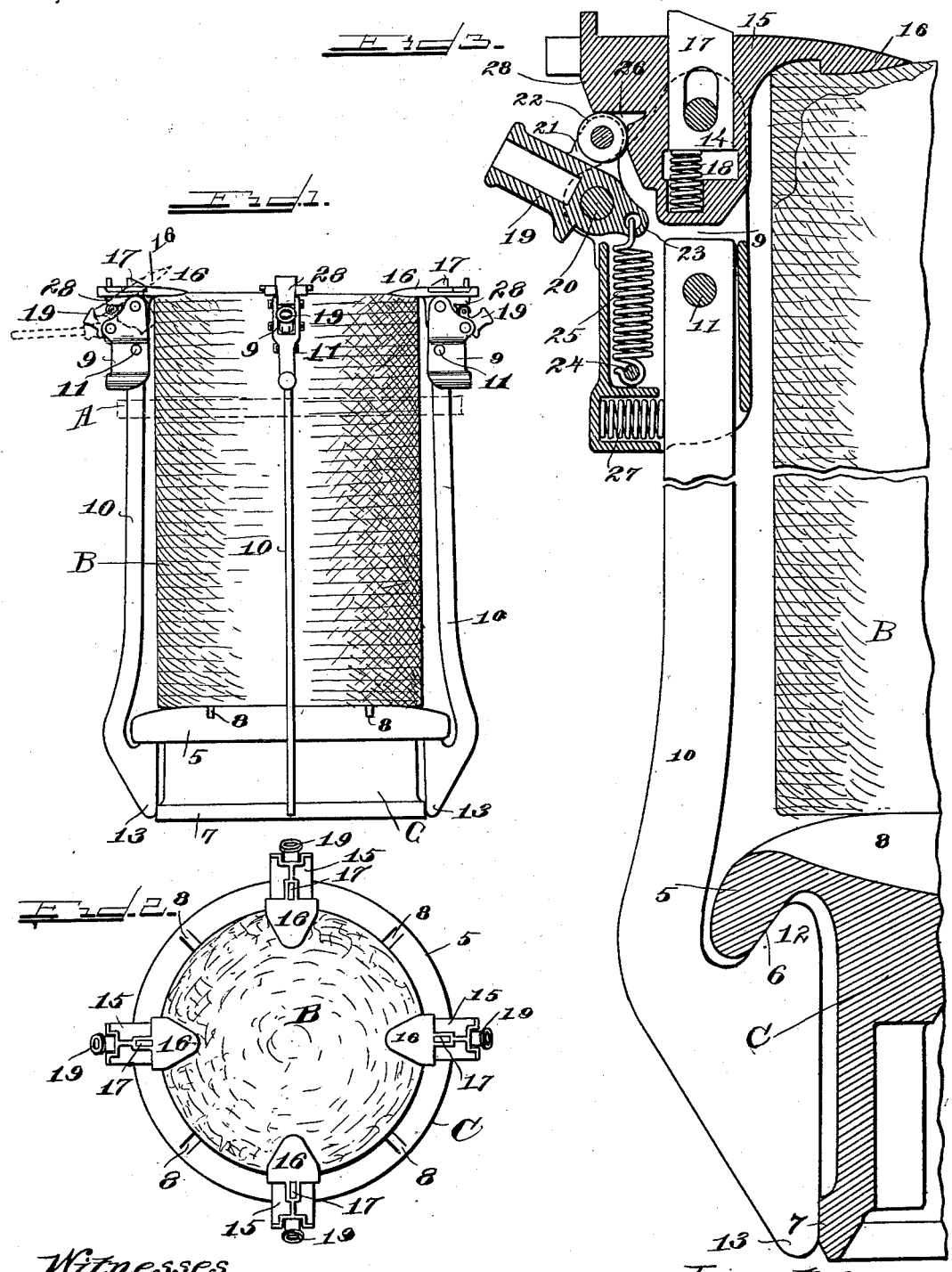

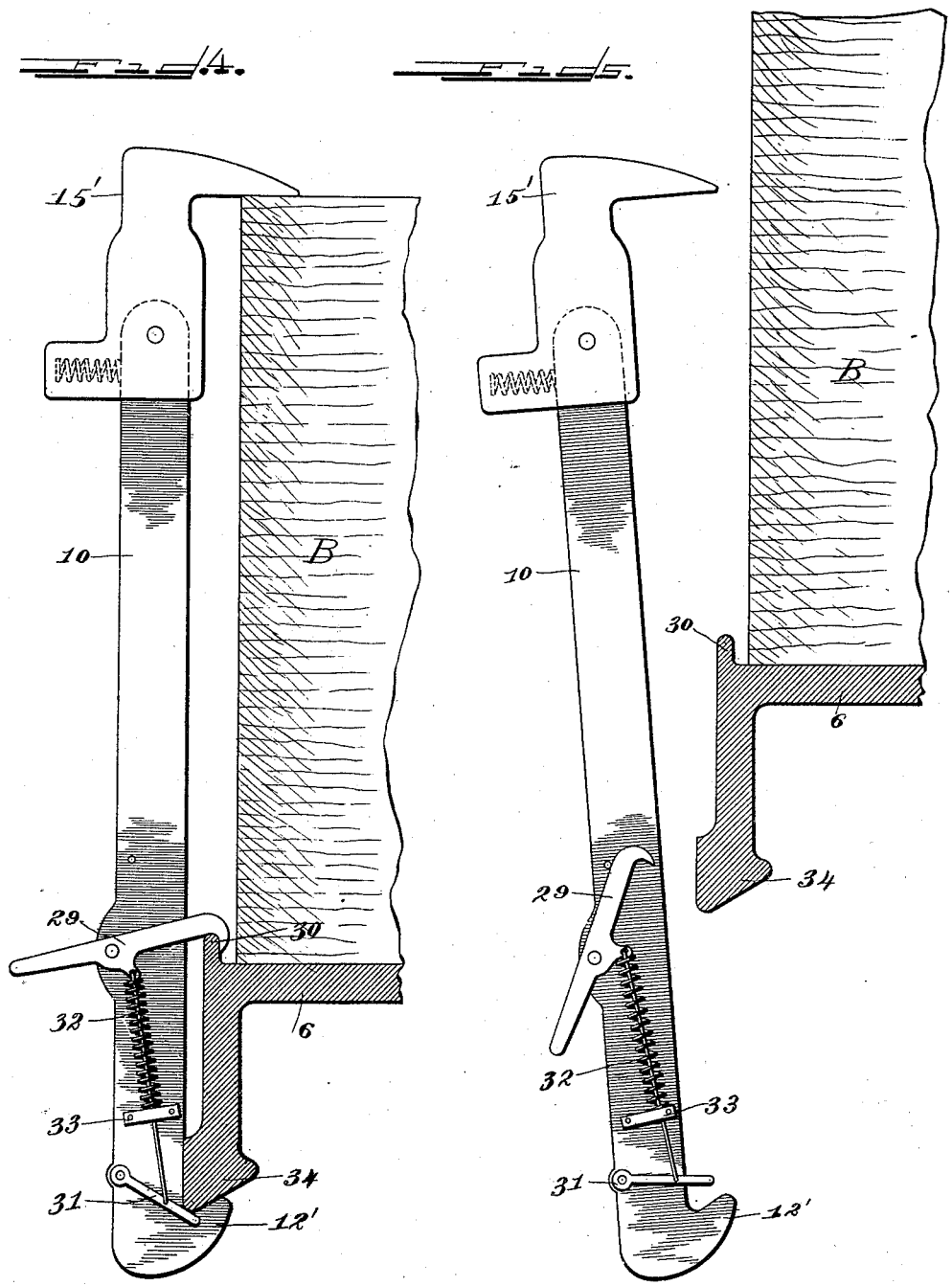

JAMES T. COWLEY, OF LOWELL, MASSACHUSETTS, ASSIGNOR TO THE PLANTERS COMPRESS COMPANY, OF BOSTON, MASSACHUSETTS.

BALE-STAYING DEVICE.

SPECIFICATION forming part of Letters Patent No. 679,832, dated August 6, 1901.

Application filed August 3, 1900. Serial No. 25,727. (No model.)

*To all whom it may concern:*

Be it known that I, JAMES T. COWLEY, a citizen of the United States, residing at Lowell, in the county of Middlesex and State of Massachusetts, have invented new and useful Bale-Staying Devices, of which the following is a specification.

This invention relates to bale-staying devices.

One object of the invention is to provide a construction of bale-staying device which is simple and efficient in operation.

A further object of the invention is to provide a construction and arrangement of bale-staying device which permits of the ready and easy disengagement of the stay from the bale while preventing the tearing of the edge of the bale where the stay engages it.

A further object of the invention is to provide a construction of bale-staying device wherein the expansive force of the bale serves to retain the staying device in efficient engaging relation with the bale, thereby avoiding the use of binding bands or straps for the staying devices.

Other objects of the invention will appear more fully hereinafter.

The invention consists substantially in the construction, combination, location, and arrangement, all as will be more fully hereinafter set forth, as shown in the accompanying drawings, and finally pointed out in the appended claims.

Referring to the accompanying drawings and to the various views and reference-signs appearing thereon, Figure 1 is a side elevation of a bale-base and bale, showing the application thereto of a bale-staying device constructed in accordance with the principles of my invention. Fig. 2 is a top plan view of the same. Fig. 3 is an enlarged longitudinal sectional view of a portion of a bale and bale-base and a staying device constructed in accordance with my invention applied thereto. Fig. 4 is a view similar to Fig. 3, showing a modified construction of bale-staying device embraced within the scope of my invention. Fig. 5 is a view similar to Fig. 4, showing the bale-staying device detached from the bale. The same part is designated by the same reference-sign wherever it occurs throughout the several views.

In the practical operation of compressing apparatus for fibrous or other material it is necessary to provide means for temporarily binding or staying the bales of compressed material while the same are being removed from the compressing apparatus in order to prevent the undue expansion thereof before the permanent stays are applied to the removed bale. It has been common heretofore to employ bale-stays of various constructions having engaging devices at the ends thereof for engagement with the ends of the bale or with reference to the ends of the bale. In such prior constructions, however, the tendency of the endwise expansion of the bale is to effect a disengagement of the bale-stay from the end of the bale, thereby rendering necessary the employment of a retaining-band, as indicated in dotted lines at A, Fig. 1, to prevent the staying devices from being forced out of staying relation with respect to the bale. Moreover, after the bale has received its permanent stays the removal of the staying devices or temporary holders, as in the prior constructions, resulted in tearing the edges of the bale at the points where the stays engaged the end of the bale. It is the special purpose of my present invention to provide a construction of staying device wherein these objections are avoided, and in the accompanying drawings I have shown various forms of construction illustrative of the generic features of my invention.

Referring to the accompanying drawings, reference-sign B designates the bale, and C the bale-base.

The bale-staying device includes a portion 10, which I will hereinafter designate the "hook" portion, and which portion is constructed to engage or to be secured in engaging relation with respect to one end of the bale. At its other end said hook portion is connected to an engaging part which engages the opposite end of the bale, as will presently be more fully explained. In practice I arrange the hooked end of the hook portion to engage the bale-base C and in such manner that the endwise expansion of the bale will exert the power thereof in a manner to efficiently hold the staying device in engaging relation with respect to the bale. This result may be accomplished in many different ways. For instance, and as shown in Fig. 3, as one form of construction and arrangement for accomplishing the desired result the hook portion 10 is provided with a projection 12, having a beveled or inclined surface, and the bale-base C is provided with a depending rim or flange 5, provided with a corresponding inclined or beveled surface 6 and against which inclined surface the projection 12 bears, as clearly shown. The bearing-surfaces of the projection 12 and rim or flange 5 are inclined or beveled inwardly, as clearly shown. At its extremity the hook portion 10 is provided with a heel 13, arranged to take bearing against a ledge 7 of the bale-base. From this construction it will be readily seen that any endwise expansion of the bale exerting a longitudinal pull upon the portion 10 of the bale-stay, through the engagement of the ends of the bale-stay with the bale, will serve to draw the projection 12 tightly against the beveled or inclined surface 6 of the flange, and hence to force the main body portion of the hook portion 10 of the stay toward the bale, and hence overcoming any tendency of the engaging devices at the other end of the stay from being forced off or out of engaging relation with respect to the end of the bale, and thus avoiding the necessity of employing a temporary retaining strap or band, as indicated in dotted lines at A, Fig. 1. It is obvious that other constructions may be devised for accomplishing this same result. For instance, in the form shown in Figs. 4 and 5 the portion 10' of the bale-staying device is provided at one end thereof with a hook 12', having an inclined or beveled surface similar to the inclined or beveled surface of projection 12, above described with reference to Fig. 3, and the bale-base C' is provided with a suitable flange or projection 34, having a similarly inclined and coöperating surface, over which the hook 12' engages and against which said hook bears, the surface of projection 34 being inclined or beveled inwardly, so as to cause the endwise expansion of the bale to exert through the bale-staying device a drawing action upon the latter to carry or force the same inwardly or toward the bale, and in order to retain the stay in place a hook 29 is pivoted upon the portion 10' of the stay, which hook is arranged to engage a projecting flange or ledge 30 of the bale-base. A rod 32 is connected at one end to the hook 29 and at the other end to a lever 31, said rod being guided in any suitable manner, as by means of a keeper 33. The lever 31 is arranged to be engaged by the edge of projection 34 of the bale-base, when the staying device is applied in engaging relation with respect thereto, so as to draw the hook 29 down into engagement with flange or ledge 30, as clearly shown in Fig. 4, the engagement of said hook and flange or ledge forming a bearing for the bale-staying device and serving to hold the same in engaging relation with respect to the bale-base and bale. It is obvious with this construction that the bearing-surface of projection 34 need not necessarily be inclined, as the engagement of hook 29 will serve the purpose of retaining the bale-stay in engaging relation and prevent the same from being forced off the bale. The greater the endwise expansion of the bale the tighter the bale-stay is clamped or held thereto.

I have mentioned above that the portion 10' of the bale-stay is connected at its opposite end to suitable means for engagement with the other end of the bale. It is desirable that this engaging device should be so constructed as to permit removal or disengagement thereof from the end of the bale without tearing or injuring such end, and it is also desirable to provide means for efficiently locking such device in engaging relation with the bale. My invention therefore includes the provision of means for accomplishing these results, and in Figs. 1, 2, and 3 I have shown, as illustrative of the broad ideas and principles of my invention, a form of construction embodying the same and comprising a frame 9, to which the hook portion 10 is pivoted, as at 11. Also pivoted to frame 9, as at 14, is what I will hereinafter term a "bale-head" 15, said head being formed or provided with a projecting portion 16, which constitutes the portion which engages the end of the bale. Suitably pivoted upon frame 9, as at 20, is a lever 19, carrying a projection 21, offset somewhat from the pivot about which lever 19 swings. A spring 25 is connected at one end, as at 23, to an extension of lever 19 and at the other end to a pin or projection 24 on frame 9, the tension of said spring being constantly exerted to rock or swing lever 19, so as to carry or hold projection 21 in engagement with the heel portion of the stay-head 15. In practice and in order to reduce friction I mount an antifriction-roller 22 upon projection 21, which roller forms the bearing-surface for engagement with the heel of the stay-head, and I form such heel with a shoulder, as at 26, with which such roller engages. From this arrangement it will be readily understood that when head 15 is adjusted into position for the blade or holder 16 thereof to engage the end of the bale the projection 21 or the roller 22 carried thereby, engaging with shoulder 26, will lock the bale-head against rotation about its pivot 14, and the expansive force of the bale against the under side or surface of the holder 16 serves to more tightly lock the bale-head. The greater such expansive force the tighter the lock.

In order that the bale-stay head may be maintained pressed inwardly or toward the bale, I arrange a spring 27 to bear at one end against frame 9 and at the other end against the hook portion 10 of the staying device. By this means the stay-head is constantly pressed toward the bale and the hook portion 10 is also maintained pressed toward the bale-base with the hook or projection thereof always in line with the lip of the bale-base when the stay-head is not projected over the end of the bale, thus allowing the hook or projection to catch under the lip or flange of the bale-base before the head is forced into position over the other end of the bale.

In order to detach or remove the bale-staying device from a bale—as, for instance, after the bale has been removed and has its permanent stays applied thereto—a suitable handle is engaged with lever 19 and said lever is rocked about its pivot and against the action of spring 25, thereby causing the roller 22 or projection 21 to become disengaged from shoulder 26 of the stay-head. This release of roller 22 from shoulder 26 allows the stay-head to become released from the bale, such release resulting in the stay dropping slightly, when it may be entirely removed. The released position of the stay-head is indicated in dotted lines in Fig. 1. When the stay-head is rocked or dropped back into the position indicated in said dotted lines, the cam-surface 28 of the head rests on roller 22 of the lever, so that when the lever is released from downward pressure the spring 25 will return said lever to initial position and which returning movement will cause the head 15 to be again rocked into position for the roller 22 to engage shoulder 26.

I have shown a locking-bolt associated with the stay-head and comprising a longitudinally-movable bolt 17, slotted for the passage therethrough of pivot 14, which pivot serves as a guide for such bolt. A spring 18 operates to maintain the bolt projected. This bolt, however, forms no part of my present invention.

In Figs. 4 and 5 the stay-head 15' is indicated only in a conventional illustration, it being obvious that the construction of the stay-head may be varied at pleasure.

The operation of the apparatus forming my invention will be readily and fully understood from the foregoing description.

Having now set forth the object and nature of my invention and a construction embodying the principles thereof and having described such construction, its purpose, function, and mode of operation, what I claim as new and useful and of my own invention, and desire to secure by Letters Patent, is—

1. In a bale-staying device composed of two portions suitably connected together, the combination of a bale-base, the portions of the staying device arranged to respectively engage the end of the bale and said base, and means operated by the endwise expansion of the bale for drawing said staying device into closer engagement with the bale and base, as and for the purpose set forth.

2. In a bale-staying device composed of two portions longitudinally movable with respect to each other, in combination with a bale-base, and means operating to tighten the grasp of the bale-staying device upon the bale to retain the same thereon as the bale expands, as and for the purpose set forth.

3. In a bale-staying device composed of two portions longitudinally movable with reference to each other, each portion adapted to be connected with an end of the bale, in combination with a bale-base, and means operating to draw the staying device in closer relation to the bale at both ends as the bale expands, substantially as and for the purpose set forth.

4. In a bale-staying device composed of two portions longitudinally movable with reference to each other and adapted to be connected with an end of the bale to retain the same under compression, in combination with a bale-base coöperatively arranged and constructed with reference to the bale-stay to effect a drawing of the portions of the bale-staying device into closer engagement with the ends of the bale under the influence of the expansive tendency of the bale, as and for the purpose set forth.

5. In a bale-staying device composed of two portions longitudinally movable with reference to each other, one of which is adapted to grasp the top of the bale and the other of which is adapted to engage a bale-base and is provided with an inclined surface, in combination with such bale-base having a correspondingly-inclined surface adapted to force the stay toward the bale and to maintain engagement of the stay with the bale under the expansive action of such bale, as and for the purpose set forth.

6. In a bale-staying device composed of two portions, one of such portions provided with a hook for engaging the bale and the other of which is provided with an inclined surface, in combination of a bale-base having a rim or flange provided with a coöperating inclined surface and an additional bearing or connection between said stay and bale-base, as and for the purpose set forth.

7. In a bale-staying device composed of two portions, one of which has means for engaging the upper end of the bale, and the other a hook portion, in combination with a bale-base affording a bearing for the said hook portion at two points; substantially as and for the purpose set forth.

8. In a bale-staying device composed of two portions, the upper of which has means for engagement with the bale at one end, and the lower of which has a hook, in combination with a bale-base adapted to be engaged by the hook, and having a bearing at another point in the length thereof for said hook; substantially as and for the purpose set forth.

9. In an apparatus of the class described, a bale-stay composed of pivotally-connected portions, and means for locking said portions against relatively swinging or rocking movements, as and for the purpose set forth.

10. In an apparatus of the class described, a bale-stay including pivotally-connected portions, one of said portions provided with a shoulder, in combination with means for engaging said shoulder and yieldingly locking said portion against swinging or rocking movement, as and for the purpose set forth.

11. In an apparatus of the class described, a bale-stay including pivotally-connected portions, one of said portions provided with a hook or projection arranged to engage the end of the bale, in combination with a lever provided with a projection, said lever being also pivotally mounted in position for said lever to engage said hook portion and lock the same against pivotal movement, as and for the purpose set forth.

12. In an apparatus of the class described, a pivotally-mounted bale-stay head, a pivotally-mounted lever having a projection arranged to engage said head, and means for yieldingly maintaining said projection in engagement with said head, as and for the purpose set forth.

13. In an apparatus of the class described, a pivotally-mounted bale-stay head, said head provided with a shoulder, a pivotally-mounted lever having a projection arranged to engage said shoulder, and a spring for normally pressing said projection against said head, as and for the purpose set forth.

14. In a bale-staying device, a frame, a hook portion and a stay-head, respectively pivoted upon said frame, as and for the purpose set forth.

15. A bale-staying device, comprising a hook portion and a stay-head, said hook portion and head being pivotally connected, and means for maintaining said hook portion and head in suitable alinement, as and for the purpose set forth.

16. A bale-staying device, comprising a pivotally-connected head and hook portion, and a spring interposed between said head and hook portion, as and for the purpose set forth.

17. A bale-staying device, comprising a frame, a head, and a hook portion pivotally connected thereto, and a spring interposed between said frame and hook portion, as and for the purpose set forth.

In witness whereof I have hereunto set my hand, this 23d day of July, 1900, in the presence of the subscribing witnesses.

JAMES T. COWLEY.

Witnesses:
WM. M. RHEEM,
R. G. BLANC.